(12) United States Patent
Brumm et al.

(10) Patent No.: US 11,993,829 B2
(45) Date of Patent: May 28, 2024

(54) POWDERS BASED ON NIOBIUM-TIN COMPOUNDS FOR PRODUCING SUPERCONDUCTIVE COMPONENTS

(71) Applicant: TANIOBIS GMBH, Goslar (DE)

(72) Inventors: Holger Brumm, Goslar (DE); Markus Weinmann, Goslar (DE); Christoph Schnitter, Holle (DE)

(73) Assignee: TANIOBIS GMBH, Goslar (DE)

( * ) Notice: Subject to any disclaimer, the term of this patent is extended or adjusted under 35 U.S.C. 154(b) by 199 days.

(21) Appl. No.: 17/427,920

(22) PCT Filed: Feb. 5, 2020

(86) PCT No.: PCT/EP2020/052819
§ 371 (c)(1),
(2) Date: Aug. 3, 2021

(87) PCT Pub. No.: WO2020/161166
PCT Pub. Date: Aug. 13, 2020

(65) Prior Publication Data
US 2022/0118512 A1    Apr. 21, 2022

(30) Foreign Application Priority Data
Feb. 8, 2019   (DE) .................. 10 2019 000 906.1

(51) Int. Cl.
*C22C 1/04*   (2023.01)
*B22F 1/05*   (2022.01)
(Continued)

(52) U.S. Cl.
CPC .............. *C22C 1/045* (2013.01); *B22F 1/05* (2022.01); *B22F 1/145* (2022.01); *B22F 1/148* (2022.01);
(Continued)

(58) Field of Classification Search
None
See application file for complete search history.

(56) References Cited

U.S. PATENT DOCUMENTS 3,325,888 A    6/1967   Weinig et al.
7,459,030 B2   12/2008  Miyazaki et al.
(Continued)

FOREIGN PATENT DOCUMENTS

DE    10 2008 048614 A1    4/2010
EP         0 048 313 A1    3/1982
(Continued)

OTHER PUBLICATIONS

R. O. Suzuki et al.: „Processes to produce superconducting $Nb_3Sn$ powders from Nb—Sn oxide, Journal of Materials Science, vol. 22, No. 6, pp. 1999-2005 (1987).
(Continued)

*Primary Examiner* — George Wyszomierski
(74) *Attorney, Agent, or Firm* — Norman B. Thot

(57) ABSTRACT

A powder for the production of a superconducting component. The powder includes $Nb_xSn_y$, where $1 \leq x \leq 6$ and $1 \leq y \leq 5$, and three-dimensional agglomerates having a particle size D90 of less than 400 μm, as determined via a laser light scattering. The three-dimensional agglomerates have primary particles which have an average particle diameter of less than 15 μm, as determined via a scanning electron microscopy, and pores of which at least 90% have a diameter of from 0.1 to 20 μm, as determined via a mercury porosimetry.

20 Claims, 8 Drawing Sheets

(51) Int. Cl.
*B22F 1/145* (2022.01)
*B22F 1/148* (2022.01)
*B22F 9/22* (2006.01)
*B22F 10/34* (2021.01)
B22F 1/065 (2022.01)
B22F 10/25 (2021.01)
B22F 10/28 (2021.01)
B22F 10/73 (2021.01)

(52) U.S. Cl.
CPC ............... *B22F 9/22* (2013.01); *B22F 10/34* (2021.01); *B22F 1/065* (2022.01); *B22F 10/25* (2021.01); *B22F 10/28* (2021.01); *B22F 10/73* (2021.01); *B22F 2301/20* (2013.01); *B22F 2304/058* (2013.01)

(56) References Cited

U.S. PATENT DOCUMENTS

| 2003/0230167 | A1 | 12/2003 | Loeffelholz et al. |
| 2005/0016854 | A1* | 1/2005 | Chen ................ H10N 60/0184 205/51 |
| 2011/0170238 | A1 | 7/2011 | Schnitter et al. |
| 2022/0115578 | A1* | 4/2022 | Schlenga ............ H10N 60/0128 |
| 2022/0118515 | A1* | 4/2022 | Brumm .................. B22F 1/145 |

FOREIGN PATENT DOCUMENTS

| JP | H 08-92668 A | 4/1996 |
| JP | 2002-544375 A | 12/2002 |
| JP | 2018-145456 A | 9/2018 |
| WO | WO 00/67936 A1 | 11/2000 |

OTHER PUBLICATIONS

T. Wong et al.: "Ti and Ta Additions to $Nb_3Sn$ by the Powder in Tube Process", IEEE Transactions on Applied Superconductivity, vol. 11, No. 1, pp. 3584-3587 (2001).

M. López et al.: "Synthesis of nano intermetallic $Nb_3Sn$ by mechanical alloying and annealing at low temperature", Journal of Alloys and Compounds, vol. 612, pp. 215-220 (2014).

A. Godeke et al.: "State of the art powder-in-tube niobium-tin superconductors", Cryogenics, vol. 48, pp. 308-316, (2008).

ASTM International Standard Test Method for Surface Area of Catalysts and Catalyst Carriers, Designation: D 3663-03, pp. 1-5 (2003).

* cited by examiner

POWDERS BASED ON NIOBIUM-TIN COMPOUNDS FOR PRODUCING SUPERCONDUCTIVE COMPONENTS

CROSS REFERENCE TO PRIOR APPLICATIONS

This application is a U.S. National Phase application under 35 U.S.C. § 371 of International Application No. PCT/EP2020/052819, filed on Feb. 5, 2020 and which claims benefit to German Patent Application No. 10 2019 000 906.1, filed on Feb. 8, 2019. The International Application was published in German on Aug. 13, 2020 as WO 2020/161166 A1 under PCT Article 21(2).

FIELD

The present invention relates to powders based on niobium-tin compounds, in particular $Nb_xSn_y$, where $1 \leq x \leq 6$ and $1 \leq y \leq 5$, for the production of superconducting components, wherein the powders have a high porosity, a process for the production thereof, and also the use of such powders for the production of superconducting components.

BACKGROUND

Superconductors are materials whose electrical resistance drops to zero when the temperature goes below a particular temperature, which is known as the critical temperature. In the superconducting state, the interior of the material remains free of electric and magnetic fields, and the electric current is transported without any losses. Superconductors are used, for example, to produce strong, constant magnetic fields or to produce low-loss transformers which for the same power have smaller dimensions and mass than conventional transformers and thus have advantages, especially in mobile operation.

Superconductors can be classified into various categories such as metallic superconductors, ceramic superconductors, and high-temperature superconductors. Since the discovery of the critical temperature of niobium-tin ($Nb_3Sn$) of 18.05-K, niobium and its alloys have moved into focus as materials for the production of superconductors. Superconducting cavity resonators made of niobium are thus used, for example, in particle accelerators (including XFEL and FLASH at the DESY in Hamburg or CERN in Geneva).

Superconducting wires are of particular interest as superconducting components, and these are used, for example, to produce superconducting coils. Kilometer-long wires having conducting fibers/filaments having a thickness of only a few microns are generally necessary for strong superconducting coils, and these require a complicated production processes.

For the production of such wires, in particular on the basis of niobium-tin alloys, recourse is made, for example, to the bronze process in which a Cu—Sn alloy is used as a starting material.

EP 0 048 313 thus describes superconducting wires based on bronze-$Nb_3Sn$ which can be employed at high magnetic fields and are characterized by a cubic phase in the bronze-$Nb_3Sn$ wire and comprise stabilizing alloy constituents from the group Li Be Mg Sc Y U Ti Zr Hf V Ta Mo Re Fe Ru Ni Pd Zn Al Ga In Tl Si Ge Sb in the wt. % range of from 0.01 to 7, based on the proportion of Nb, and/or from 0.05 to 10, based on the proportion of bronze in the wire, which largely prevent formation of a tetragonal phase and/or reduce tetragonal deformation (1−c/a).

As an alternative, superconducting wires based on niobium-tin alloys can be produced by the PIT (powder-in-tube) process in which a pulverulent tin-containing starting compound is introduced into a niobium tube and is then drawn to provide a wire. In the last step, a superconducting $Nb_3Sn$ boundary layer is formed between the niobium-containing sheathing tube and the tin-containing powder introduced via a heat treatment. The phase composition, chemical purity and particle size of the tin-containing starting compound, which must be no greater than the diameter of the finished filament, are thereby critical.

T. Wong et al. describe a PIT process and the production of the tin-containing starting compound for the example of $NbSn_2$ (T. Wong et al., "Ti and Ta Additions to $Nb_3Sn$ by the Powder in Tube Process", *IEEE Transactions on Applied Superconductivity*, Vol. 11, No. 1 (2001), 3584-3587). A disadvantage of the process is that a multistage process made up of milling steps and thermal treatments of up to 48 hours is necessary for a satisfactory reaction of niobium with tin to form $NbSn_2$. The general teaching is furthermore that the oxygen content should be very low.

U.S. Pat. No. 7,459,030 describes a production process for a superconducting $Nb_3Sn$ wire by the PIT process; in which a tantalum-tin alloy powder is used as a starting compound. To produce this, use is made of $K_2NbF_7$ and $K_2TaF_7$, which are reduced to the respective niobium metal and tantalum metal before the reaction with tin. The process described has the disadvantages, however, of some restrictions to the use of these niobium and tantalum metals. Only metals having a maximum content of oxygen of less than 3000 ppm and hydrogen of less than 100 ppm can thus be used. Exceeding the oxygen content leads to a lower quality of the finished wire. At hydrogen contents above 100 ppm, safety problems occur in the process, since the hydrogen escapes during the thermal treatment. The process described furthermore has the disadvantages that the target compound contains a high content of unreacted tin and the finished wire core also contains tantalum-containing compounds, which can have an adverse effect on the superconducting properties of the wire. Sparingly soluble metal fluorides such as $MgF_2$ or $CaF_2$ are furthermore formed in the reduction of the starting compounds $K_2NbF_7$ and $K_2TaF_7$, and these cannot be separated off completely. All fluorine-containing compounds in the process chain are additionally very toxic.

M. Lopez et al. describe the synthesis of nano-intermetallic $Nb_3Sn$ by mechanical alloying and heat treatment at low temperatures (M. Lopez et al., "Synthesis of nano intermetallic $Nb_3Sn$ by mechanical alloying and annealing at low temperature", *Journal of Alloys and Compounds* 612 (2014), 215-220). The process described has the disadvantage, however, that impurities are introduced into the product via the milling.

A. Godeke et al. provide an overview of the conventional PIT processes for the production of niobium-tin superconductors (A. Godeke et al., "State of the art powder-in-tube niobium-tin superconductors", *Cryogenics* 48 (2008), 308-316).

All processes described in the prior art for producing superconducting wires composed of $Nb_3Sn$ or for producing from the elements the niobium-tin precursor powders, for example, $NbSn_2$, necessary for the production thereof have the disadvantage that the tin must get into the interior of the niobium particles by solid-state diffusion in order to obtain a complete reaction of the niobium with tin. This process is extremely time-consuming and also cannot be accelerated by the input of energy because of the decomposition of $NbSn_2$ at temperatures above 840° C. The production of NbSn$_2$ is in particular difficult in practice. The known exothermic nature of the reaction normally leads to the decomposition temperature of NbSn$_2$ of 840° C. being exceeded under the usual process conditions of from 800 to 1200° C.

The niobium-tin powders known in the prior art can furthermore be milled only with difficulty, which leads to the introduction of impurities from the steel- or cemented carbide-containing milling media used, for example, iron, cobalt, nickel, silicon, tungsten or carbon, and to low-quality products in the production of wire.

A further disadvantage of known processes for producing the niobium-tin powders is the use of very toxic halogen-containing compounds such as K$_2$NbF$_7$ or NbCl$_5$. These serve as precursors for a reduction with a suitable reducing agent to form niobium metal which is reacted with tin in a further step to provide the niobium-tin target compound.

The known processes for producing the niobium-tin powders furthermore have the disadvantage that a significant proportion of oxygen is carried over to the target compounds as a result of introduction of oxygen into the elements niobium and tin. The process according to U.S. Pat. No. 7,459,030, for example, is for this reason restricted to the use of niobium and tantalum metal powders having an oxygen content of not more than 3000 ppm and tin having an oxygen content of not more than 2000 ppm.

SUMMARY

An aspect of the present invention is to provide suitable starting compounds for the production of superconducting components, in particular superconducting wires, which allow for a shortening of the time-consuming solid-state diffusion step and which have an improved milling behavior, and also a process for the production thereof which avoids the reduction of halogen-containing precursors.

In an embodiment, the present invention provides a powder for the production of a superconducting component. The powder includes Nb$_x$Sn$_y$, where 1≤x≤6 and 1≤y≤5, and three-dimensional agglomerates having a particle size D90 of less than 400 µm, as determined via a laser light scattering. The three-dimensional agglomerates have primary particles which have an average particle diameter of less than 15 µm, determined via a scanning electron microscopy, and pores of which at least 90% have a diameter of from 0.1 to 20 µm, determined via a mercury porosimetry.

BRIEF DESCRIPTION OF THE DRAWINGS

The present invention is described in greater detail below on the basis of embodiments and of the drawings in which.

DETAILED DESCRIPTION

Figure 1:
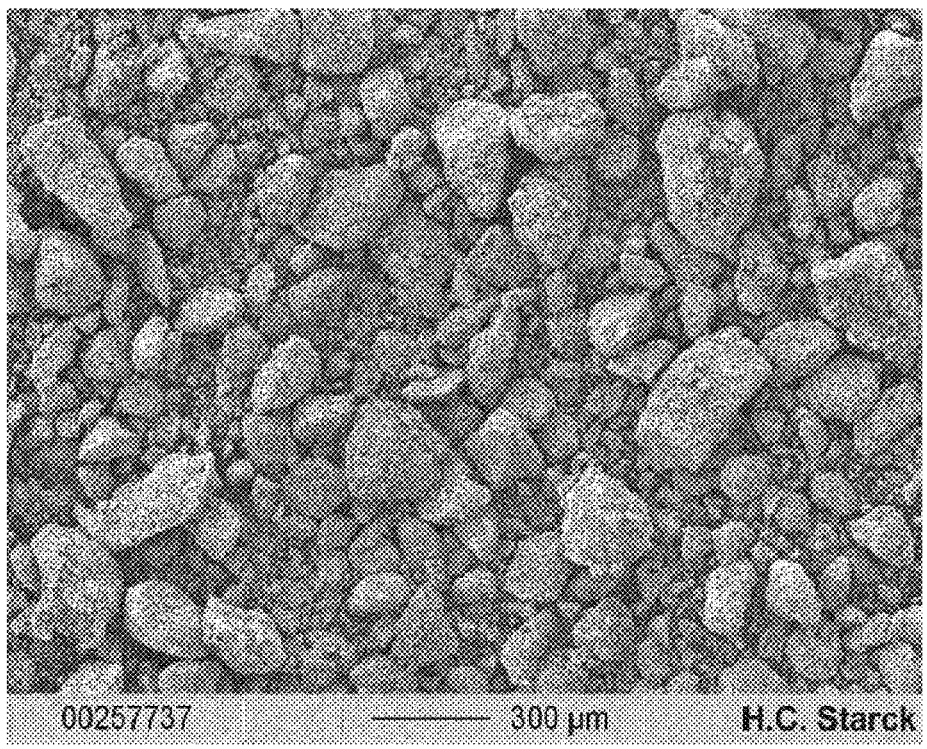
FIG. 1 shows a scanning electron micrograph of a NbSn$_2$ powder obtained per Example 1 of the present invention.
Figure 1:
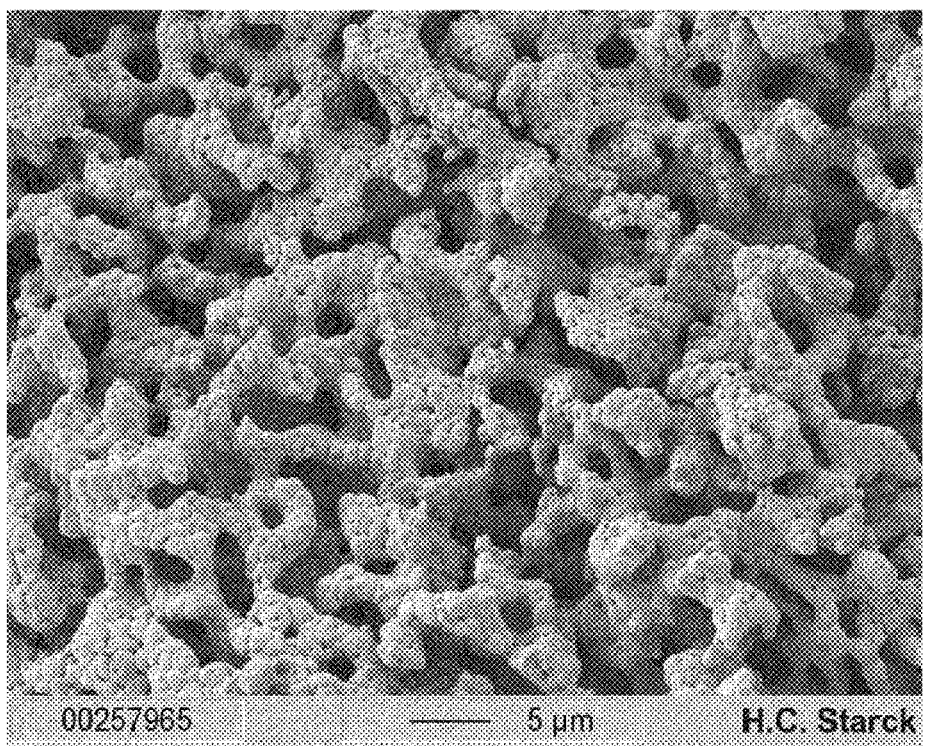

The present invention thus firstly provides a powder for the production of superconducting components, the powder comprising Nb$_x$Sn$_y$, where 1≤x≤6 and 1≤y≤5, wherein the powder comprises three-dimensional agglomerates having a size having a D90 of less than 400 µm, for example, from 220 to 400 µm, determined by means of laser light scattering, the agglomerates being made up of primary particles which have an average particle diameter of less than 15 µm, for example, less than 8 µm, for example, from 0.1 µm to 5 µm, determined by means of scanning electron microscopy, and the agglomerate have pores of which 90% or more have a diameter of from 0.1 to 20 µm, for example, from 0.2 to 15 µm, for example, from 0.3 to 10 µm, determined by means of mercury porosimetry.

In an embodiment of the present invention, the agglomerates can, for example, have a particle size distribution having a D50 of from 100 to 300 µm, for example, from 150 to 220 µm, determined by means of laser light scattering.

The D90 or the D50 is the value which indicates the percentage of agglomerates in the powder which have a particle size of less than or equal to the size indicated.

In an embodiment, the Nb$_x$Sn$_y$ compound can, for example, be a compound selected from the group consisting of Nb$_3$Sn, Nb$_6$Sn$_5$, NbSn$_2$, and mixtures thereof.

It has surprisingly been found that the required diffusion paths within the niobium solid body in the powder of the present invention are significantly reduced due to the small primary particle size, and that the tin can very readily enter into the interior of the agglomerates during the reaction because of the particular pore structure, as a result of which the production process can be significantly accelerated. It has furthermore surprisingly been found that the temperatures at which the production of the powders is generally carried out, or the reaction times, could be significantly reduced. For example, NbSn$_2$, which is stable only up to a temperature of 840° C., could thus be produced at a temperature of less than 800° C. in the context of the present invention in less than 6 hours and even in less than 4 hours. In the case of Nb$_3$Sn, a time window of less than 6 hours was obtained at a temperature of 1050° C. and a time window of less than 8 hours was obtained at a temperature of 950° C.

It has been found to be particularly advantageous to use phase-pure powders for the production of superconductors in order to avoid influencing the superconducting properties by any foreign phases. It has surprisingly been found that the powder of the present invention also displays a high purity which results, for example, in the powder having only a small proportion of phases of compounds other than the respective target compound. In an embodiment, the powder of the present invention is therefore characterized in that the compounds Nb$_3$Sn or Nb$_6$Sn$_5$ or NbSn$_2$ make up a proportion of in each case more than 90%, for example, more than 94%, for example, more than 97%, based on all detected crystallographic phases and determined by Rietveld analysis of an X-ray diffraction pattern of the powder of the present invention.

In an embodiment, the powder of the present invention can, for example, be characterized in that the proportion of metallic tin in the powder is less than 3%, for example, less than 0.5%, based on all detected crystallographic phases and determined by Rietveld analysis of an X-ray diffraction pattern of the powder of the present invention. In an embodiment, the powder of the present invention can, for example, be essentially free of metallic tin. "Essentially free" in this context means that the proportion of metallic tin is not detectable in an X-ray diffraction pattern.

The presence of oxygen can lead to a deterioration in the properties of the superconductor. It has here surprisingly been found that the powders according to the present invention do not have increased oxygen contents compared to the prior art despite the increased porosity. In an embodiment, the powder can, for example, have an oxygen content of less than 1.8% by weight, for example, from 0.35 to 1.5% by weight, in particular from 0.5 to 1.2% by weight, based on the total weight of the powder.

The powder of the present invention can, for example, have a specific surface area determined by the BET method of from 0.5 to 5 m$^2$/g, for example, from 1 to 3 m$^2$/g. The specific surface area determined by the BET method can be measured in accordance with ASTM D3663.

It has been found to be advantageous to use powders having a particularly fine particle size for the production of superconducting wires by the PIT method. For this reason, the powders used are usually milled before introduction into the tube. It has here surprisingly been found that the powders of the present invention display an improved milling behavior, as a result of which it is possible to realize smaller particle sizes or, as an alternative, it is possible to employ more gentle milling processes. In an embodiment, the powder of the present invention after milling of the agglomerates can, for example, have a particle size having a D99 of less than 15 μm, for example, less than 8 μm, for example, from 1 μm to 6 μm, determined by means of laser light scattering. In an embodiment, the powder of the present invention after milling of the agglomerates can, for example, have a D90 of less than 10 μm, for example, less than 7 μm and, for example, from less than 0.5 μm to 5 μm, in each case determined by means of laser light scattering.

For the production of superconducting components using additive manufacturing methods, for example, LBM (laser beam melting), EBM (electron beam melting) and/or LC (laser cladding), it has been found to be advantageous to use powders having a particularly spherical particle shape. It has here surprisingly been found that the powders of the present invention can be atomized very readily by known methods to give powders having spherical particles, for example, using the EIGA method (electrode induction-melting gas atomization). In an embodiment, at least 95% of all powder particles of the powder of the present invention therefore can, for example, have a Feret diameter of from 0.7 to 1, for example, from 0.8 to 1, after atomization, where the Feret diameter is, in the context of the present invention, defined as the smallest diameter divided by the largest diameter of a particle, which can be determined by evaluation of SEM images.

The powder of the present invention in particular displays a high purity. In an embodiment, the present invention therefore provides that the proportion of all metallic elements can, for example, be less than 500 ppm, for example, less than 300 ppm, for example, from 1 ppm to 150 ppm, in the powder, in each case based on the total weight of the powder. The metallic elements are especially ones which are introduced via milling processes. For the purposes of the present invention, ppm figures are in each case by mass.

For the production of superconducting components having acceptable properties, it is indispensable for the chemical purity of the powders used to be high and foreign materials to be introduced only in controlled form as dopants. Materials introduced unintentionally in the process, in particular metallic impurities and fluoride-containing compounds, should be minimized. One of the main sources of these impurities is contamination from the niobium and tin metal powders used. In an embodiment, the powder of the present invention can, for example, have a fluorine content of less than 15 ppm, for example, less than 5 ppm. In an embodiment, the powder of the present invention can, for example, have a total content of coincidental metallic impurities with the exception of tantalum of in total less than 0.8% by weight, for example, less than 0.5% by weight, for example, less than 0.25% by weight, in each case based on the total weight of the powder.

In an embodiment, the powder of the present invention can, for example, additionally contain dopants which, in contrast to the above-described materials introduced unintentionally in the process, are added in a defined way to the powder of the present invention, as is known from the prior art. It has surprisingly been here found that the dopants do not have to meet any particular requirements, but rather that it is possible to use the conventional dopants which are known to a person skilled in the art.

Some of the processes described in the prior art for producing superconducting wires based on $Nb_3Sn$ start out from a tantalum-tin alloy or from an intermetallic tin alloy based on tantalum and niobium as a precursor powder. This has the disadvantage, however, that residues of tantalum remain in the later core of the $Nb_3Sn$ wire filament, as a result of which, for example, production costs increase and the superconducting properties of the products are impaired. A further disadvantage which may be mentioned here is, in particular, the reduced thickness of the superconducting $Nb_3Sn$ boundary layer in the finished wire filament, with the expected adverse effects on the maximum current carrying capability. In an embodiment, the powder of the present invention can, for example, therefore be essentially free of tantalum and tantalum compounds. In an embodiment, the proportion of tantalum and compounds thereof in the powder of the present invention can, for example, be less than 1% by weight, for example, less than 0.5% by weight, for example, less than 0.1% by weight, in each case based on the total weight of the powder.

The powders of the present invention display, due to their high porosity combined with a small primary particle size, properties which are realized by means of a specific production process. The present invention therefore further provides a process for producing the powders of the present invention, which process allows precisely this combination of properties to be realized. The process of the present invention is characterized in that the powder of the present invention is produced by reacting a niobium metal powder with a tin metal powder, where the niobium metal powder is obtained by reduction of niobium oxide by means of a gaseous reducing agent. It has surprisingly been found that powders which, due to the advantageous combination of primary particle size, porosity, and chemical purity, are particularly suitable for the production of superconducting wires are thereby obtained. Suitable methods for reducing niobium oxide in the presence of a gaseous reducing agent are described, for example, in WO 00/67936.

In order to make the process efficient, it has been found to be advantageous to carry out the formation and reaction of the niobium metal powder in a combined process step. In an embodiment, the process of the present invention can, for example, be performed in which the niobium metal powder is obtained in situ. This can in particular be achieved by niobium oxide being reacted with the gaseous reducing agent in the presence of tin metal powder in a heat treatment.

It has surprisingly been found that this makes it possible to obtain structures which have the desired porosity. This is particularly unexpected because a person skilled in the art would not have expected porous NbSn products in the reduction of NbSn mixed oxides and hydroxides by means of magnesium.

The niobium oxide can, for example, be selected from the group consisting of $Nb_2O_5$, $NbO_2$, $NbO$, and mixtures thereof.

It has surprisingly been found that a porosity of the powder which is advantageous for the production of superconducting wires can be achieved by suitable selection of the starting compounds. In an embodiment, the present invention provides that the niobium metal powder can, for example, comprises three-dimensional agglomerates having a size having a D90 of less than 400 µm, for example, from 200 to 350 µm, determined by means of laser light scattering, the agglomerates being made up of primary particles which have an average particle diameter of less than 10 µm, for example, less than 4 µm, for example, from 0.1 µm to 2 µm, determined by means of scanning electron microscopy, and the agglomerates have pores with a size of from 0.1 to 20 µm, for example, from 0.2 to 15 µm, for example, from 0.2 to 5 µm, determined by means of mercury porosimetry.

The use of niobium metal powders having a bimodal pore size distribution has been found to be particularly advantageous. In an embodiment, the present invention provides that the niobium metal powder can, for example, have a bimodal pore size distribution, for example, with a maximum in the range from 0.9 to 20 µm, for example, from 1 to 10 µm, and a maximum in the range from 0.1 to 0.9 µm, for example, in the range from 0.2 to 0.8 µm, determined by means of mercury porosimetry. Without wishing to be tied to a particular theory, it is assumed that the biomodal distribution of the pore sizes makes possible an improved intrusion of the tin through the pores into the interior of the agglomerates.

It has surprisingly been found that limiting the oxygen content of the niobium metal powders, as described in the prior art, is not necessary for the production of the powders of the present invention. It has nevertheless been found to be advantageous for the oxygen content not to be too high. The niobium metal powder used for the production of the powders of the present invention can therefore have, for example, an oxygen content of less than 2.2% by weight, for example, from 0.35 to 1.9% by weight, for example, from 0.4 to 1.6% by weight, in each case based on the total weight of the niobium metal powder. It is also not necessary to limit the hydrogen content of these niobium metal powders to less than 100 ppm. It is thus also possible to use niobium metal powders having a hydrogen content of greater than 100 ppm, even from 110 to 400 ppm, in the process of the present invention. In an embodiment, the present invention provides that the niobium metal powder used for the production of the powders of the present invention can, for example, have a hydrogen content of from 110 to 400 ppm, based on the total weight of the niobium metal powder.

To prevent the formation of undesirable and sometimes sparingly soluble Mg halides and Ca halides, for example, $MgF_2$ and $CaF_2$, a niobium metal powder having a very low fluorine and chlorine content can, for example, be used. For this reason, niobium metal powders produced by metallothermic vapor reduction of niobium oxides are preferred over niobium metal powders produced by reduction of fluorine-containing compounds, for example $K_2NbF_7$, or electrochemical reduction in a halide-containing salt melt. In an embodiment, the niobium metal powder used can, for example, contain less than 15 ppm of each of fluorine and chlorine, for example, in each case less than 10 ppm, for example, in each case less than 2 ppm, based on the total weight of the niobium metal powder.

To provide the necessary chemical purity of the powders of the present invention, use of niobium metal powders having a total of all metallic elements of less than 800 ppm, for example, less than 500 ppm can, for example, be used.

As gaseous reducing agent, alkaline earth metal compounds have been found to be particularly advantageous. In an embodiment, the gaseous reducing agent can, for example, be magnesium vapor. It has been found that a good wetting of the niobium oxide powder particles can thereby be achieved. Magnesium, in particular as a reducing agent, has the advantage that it can be removed simply and efficiently after the conversion into MgO, as a result of which unnecessary contamination of the products is avoided.

The desired target compounds can be produced by the process of the present invention at lower temperatures and in a shorter time than has to date been described in the prior art. In an embodiment, the process of the present invention provides that the reaction of the metallic niobium powder with the metallic tin can, for example, be carried out at a reaction temperature in the range from 300 to 1100° C., for example, from 600 to 1050° C., for example, from 650 to 790° C. The reaction time can, for example, be less than 8 hours, for example, from 0.5 to 7 hours, for example, from 1 to 4 hours.

As indicated above, dopants via which the properties of the powder can be adapted can be added to the powder. It has surprisingly been found to be advantageous for these dopants to be introduced right at the beginning of the process. For this reason, the present invention provides an embodiment in which the niobium oxide used for producing the niobium metal powder can, for example, additionally comprises dopants. There are no particular requirements which need be met in respect of the dopants used. It has rather surprisingly been found that all customary dopants known to a person skilled in the art can be used.

The powder of the present invention is particularly suitable for the production of superconducting components. The present invention therefore further provides for the use of the powder of the present invention for producing superconducting components, in particular for producing superconducting wires. The superconducting component can, for example, be produced by powder-metallurgical processes or additive manufacturing processes or PIT processes. The superconducting wires can, for example, be produced via PIT processes.

The present invention further provides for the use of the powder of the present invention in additive manufacturing processes. The additive manufacturing processes can, for example, be LBM (laser beam melting), EBM (electron beam melting) and/or LC (laser cladding).

The present invention will be illustrated with the aid of the following examples which should, however, not in any way be construed as restricting the inventive concept.

EXAMPLES

Niobium metal powder was obtained in a manner analogous to the production process described in WO 00/67936

A1 by reaction of $NbO_2$ with magnesium vapor. The niobium metal powder obtained had an oxygen content of 8500 ppm, a hydrogen content of 230 ppm, a fluorine content of 2 ppm, total metallic impurities of 310 ppm, and an agglomerate size having a D50 of 205 μm and a D90 of 290 μm. The average size of the primary particles was 0.6 μm, and the pore size distribution of the agglomerates was bimodal with maxima at 0.5 and 3 μm (see FIG. 6). This niobium metal powder was subsequently reacted with tin metal powder having an oxygen content of 6800 ppm under various conditions, and the products obtained were analyzed.

In Comparative Examples 1 and 2, use was made of powders for which conventional pore-free niobium metal powder having an oxygen content of 2900 ppm and a hydrogen content of 10 ppm was used. These comparative powders had a D90 of 95 μm (see FIG. 8).

For Comparative Examples 3 and 4, a niobium metal powder was produced by reduction of $K_2NbF_7$ with liquid sodium in a salt melt composed of KCl/KF at 850° C. and subsequently removing all salts by washing. The niobium metal powder produced in this way contained irregularly shaped particles without pores having a D90 of 29 μm which were not sintered together to form agglomerates. The niobium metal powder had an oxygen content of 2.4% by weight, a hydrogen content of 150 ppm, a fluorine content of 2500 ppm, and metallic impurities of 10 200 ppm in total, with the main impurities being nickel and iron.

In all Comparative Examples, the niobium metal powders were subsequently reacted with tin metal powder having an oxygen content of 6800 ppm under various conditions and the products obtained were analyzed.

The tin metal powder used had a particle size of less than 150 μm in all Examples.

The results are summarized in Table 1, with the pore sizes and particle sizes reported each relating to the agglomerates. The particle size was in each case determined by means of laser light scattering (MasterSizer S, dispersion in water and Daxad® 11, 5 minutes ultrasonic treatment). The size of the pores was determined by means of mercury porosimetry (Micromeritics; AutoPore IV) and relates to the position of the maximum of the pore size distribution. The oxygen content was determined by means of carrier gas hot extraction (Leco TCH600). Trace analysis of the metallic impurities was carried out by means of ICP-OES using the following analytical instruments PQ 9000 (Analytik Jena) or Ultima 2 (Horiba). All figures reported in % by weight are based on the total weight of the powder.

X-ray diffraction was carried out on pulverulent samples using an instrument from Malvern-PANalytical (X'Pert-MPD with semiconductor detector, X-ray tubes Cu LFF with 40 KV/40 mA, Ni filter).

The powder of Example 3 was analyzed after washing with $H_2SO_4$ and drying.

The powders of the Comparative Examples did not form agglomerates and displayed an inhomogeneous phase composition in the analyses. The powders of Comparative Examples 3 and 4 are furthermore characterized by very high fluorine contents of from 1300 to 1800 ppm and metallic impurities of from 6500 to 9000 ppm in total, and are therefore not suitable for producing superconducting components, in particular wires.

The powder of Example 1 was subsequently milled in an oxygen-free atmosphere, giving particle size distributions having a D90 of 2.6 μm and a D99 of 3.7 μm. The oxygen content after milling was 1.14% by weight and the difference between all total metallic impurities before and after the milling process was 140 ppm.

In the context of the present invention, it was surprisingly found that the increased porosity of the powders of the present invention does not lead, contrary to expectations, to an increase in the oxygen content, even when the powders were subjected to a further milling step.

The examples according to the present invention furthermore show that no unreacted tin could be detected in the target compounds.

Figure 2:
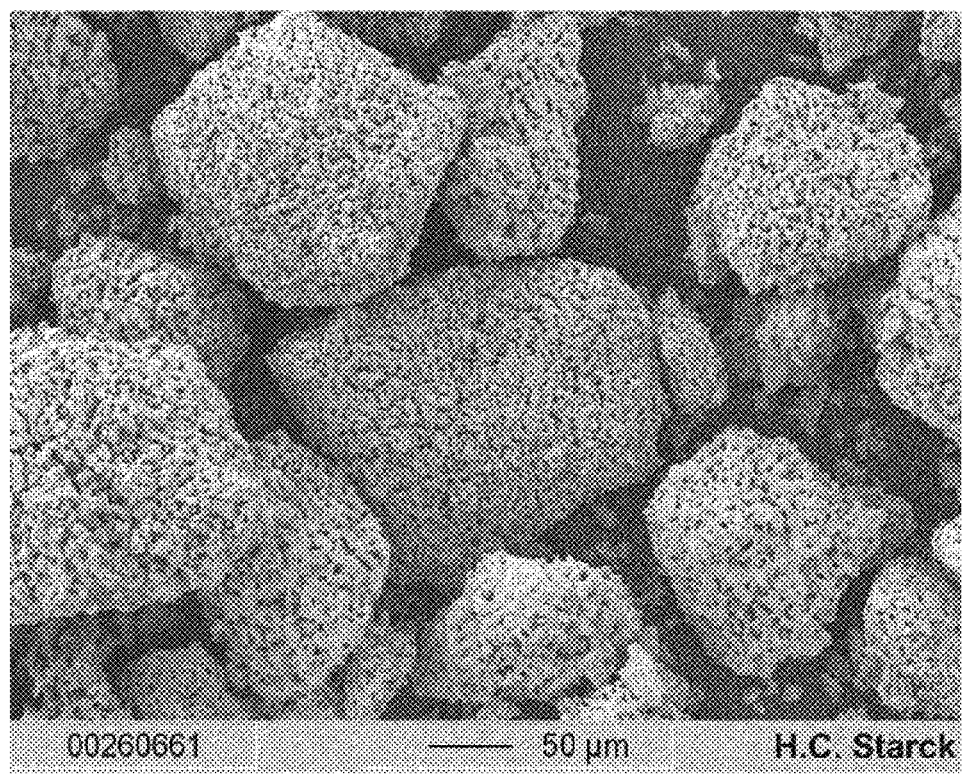
FIG. 2 shows a scanning electron micrograph of a Nb$_3$Sn powder obtained per Example 2 of the present invention.
Figure 2:
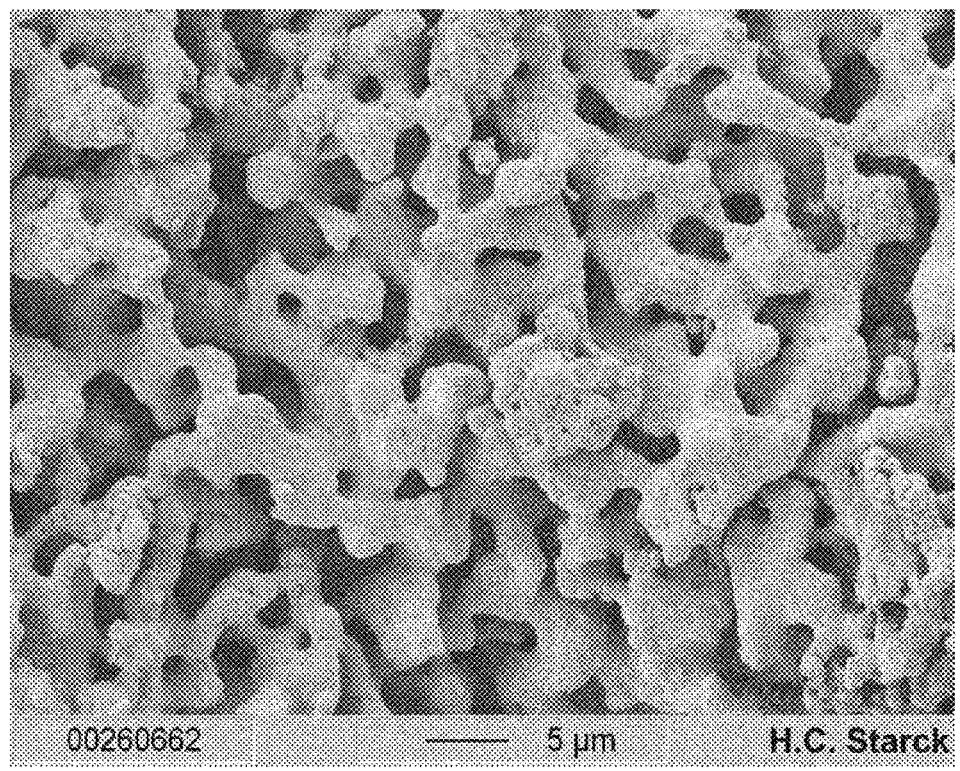
Figure 3:
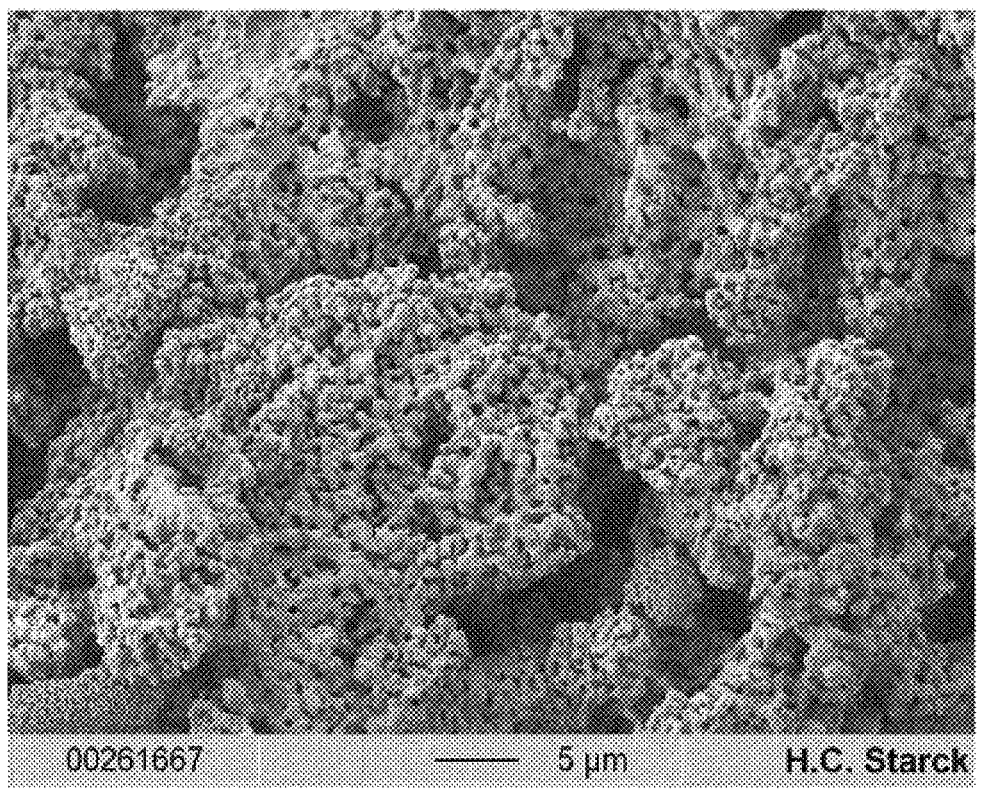
FIG. 3 shows a scanning electron micrograph of a Nb$_3$Sn powder obtained per Example 3 of the present invention.
Figure 4:
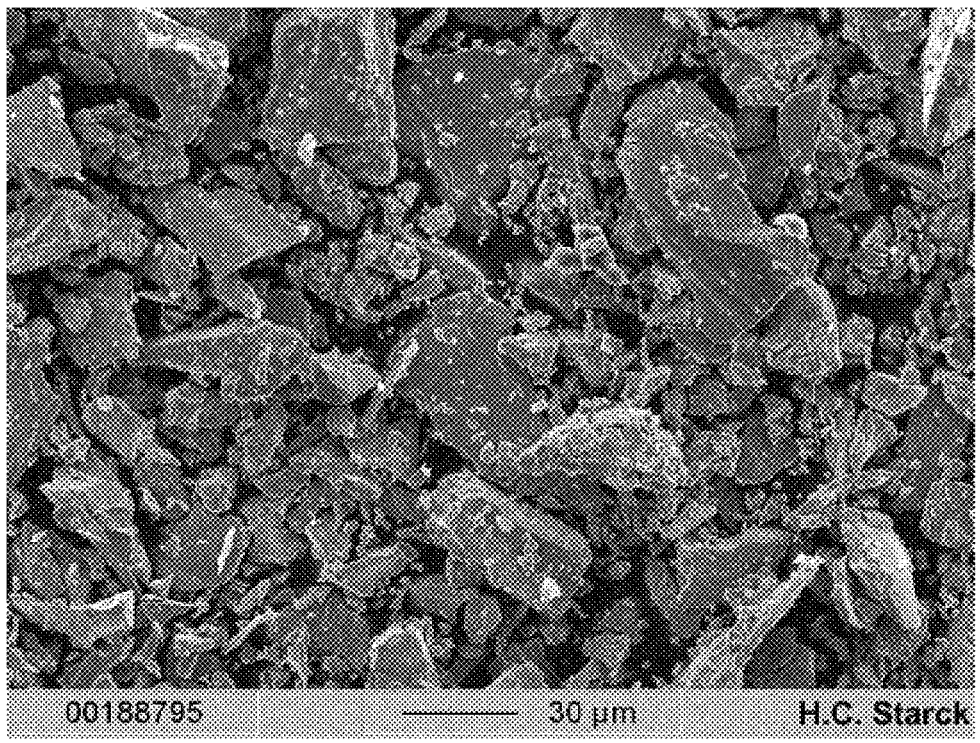
FIG. 4 shows a scanning electron micrograph of a conventional powder obtained per Comparative Example 1.
Figure 5:
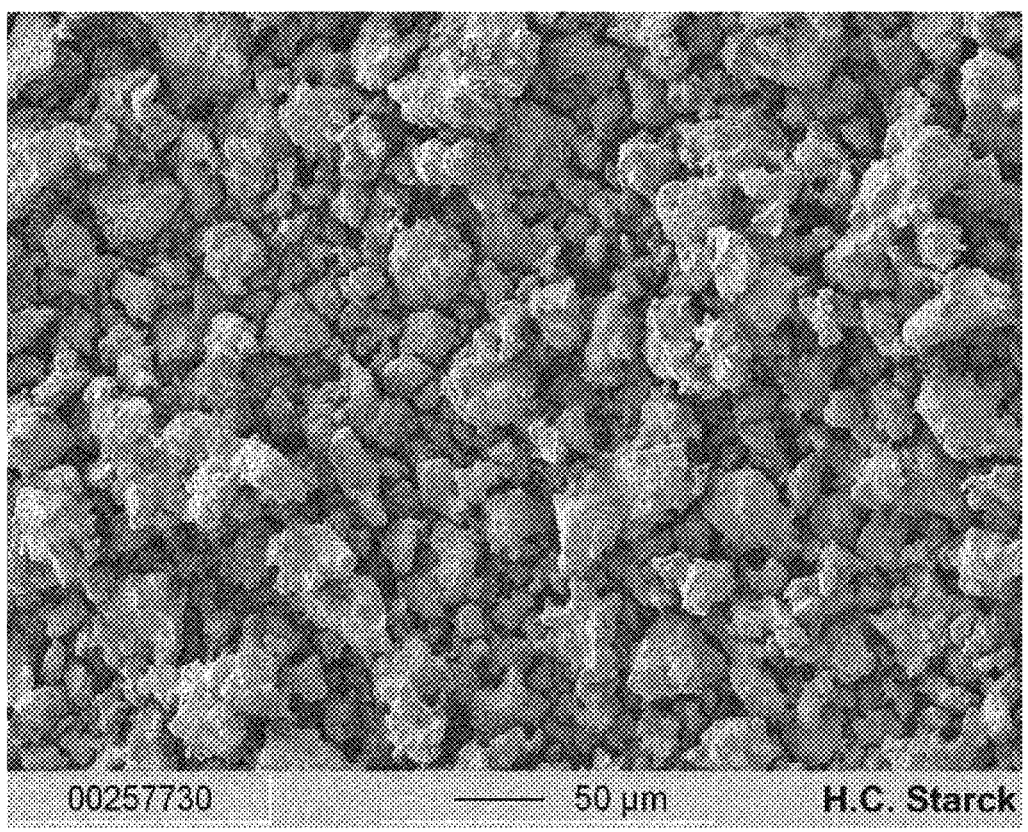
FIG. 5 shows a scanning electron micrograph of a conventional powder obtained per Comparative Example 2.

FIGS. 1 to 3 show scanning electron micrographs of the powders according to the present invention, with FIG. 1 showing the $NbSn_2$ obtained as per Example 1, FIG. 2 showing the $Nb_3Sn$ obtained as per Example 2, and FIG. 3 showing the $Nb_3Sn$ obtained as per Example 3. It can clearly be seen on all micrographs that the powders according to the present invention have a porosity which was not observed in the case of conventional powders, as can be seen in FIGS. 4 and 5, which show scanning electron micrographs of Comparative Examples 1 and 2.

Figure 6:
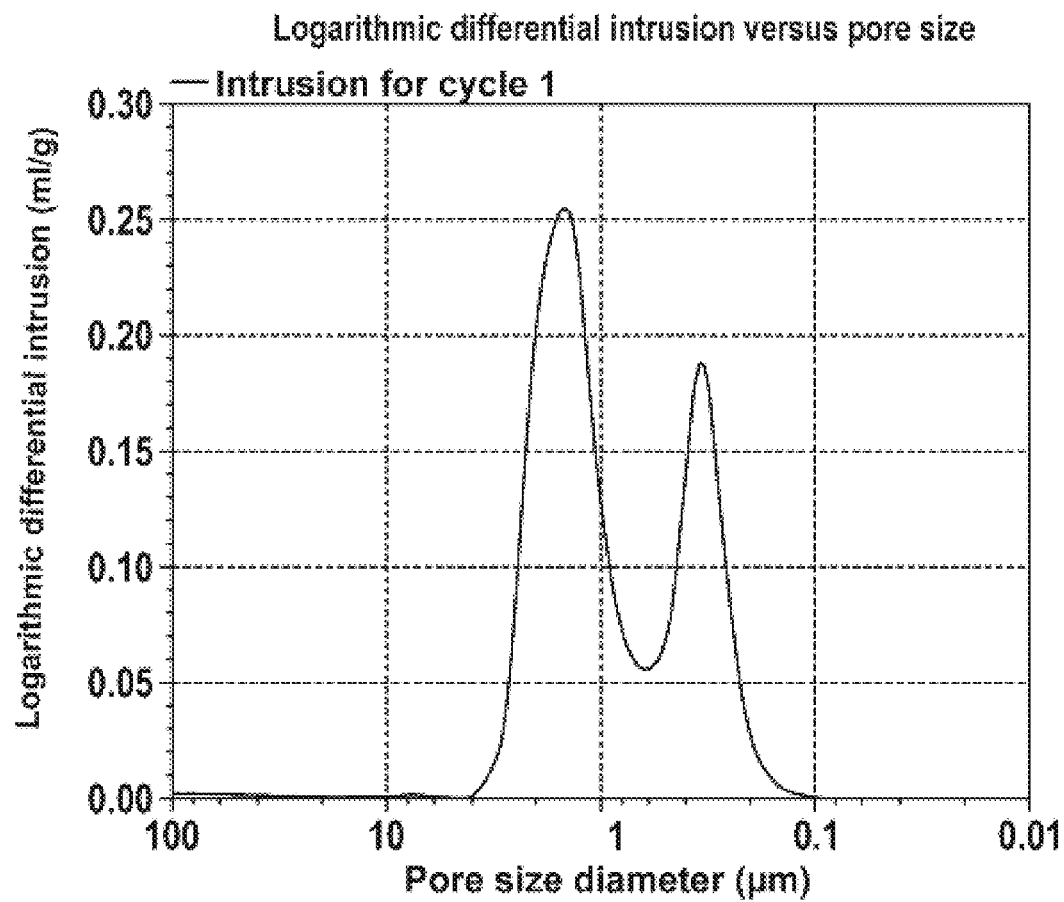
FIG. 6 shows a measurement of the pore size distribution of the niobium metal powder used for producing the powders according to the present invention, where the bimodal distribution of the pore sizes is readily apparent.

FIG. 6 shows a measurement of the pore size distribution of the niobium metal powder used for producing the powders according to the present invention, with the bimodal distribution of the pore sizes being readily visable.

Figure 7:
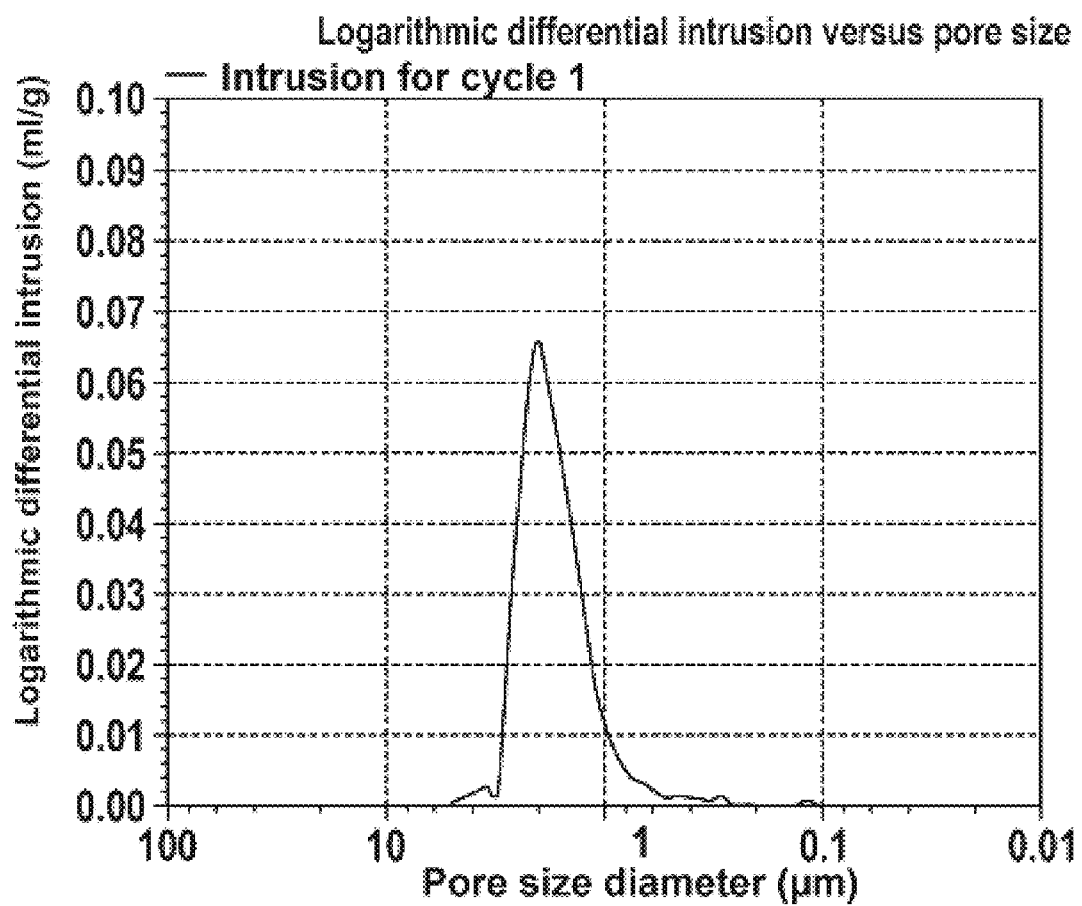
FIG. 7 shows a measurement of the pore size distribution of the powder according to the present invention as per Example 1 with a maximum at a pore size of about 3 µm.

FIG. 7 shows a measurement of the pore size distribution of the powder according to the present invention as per Example 1 with a maximum at a pore size of about 3 μm.

Figure 8:
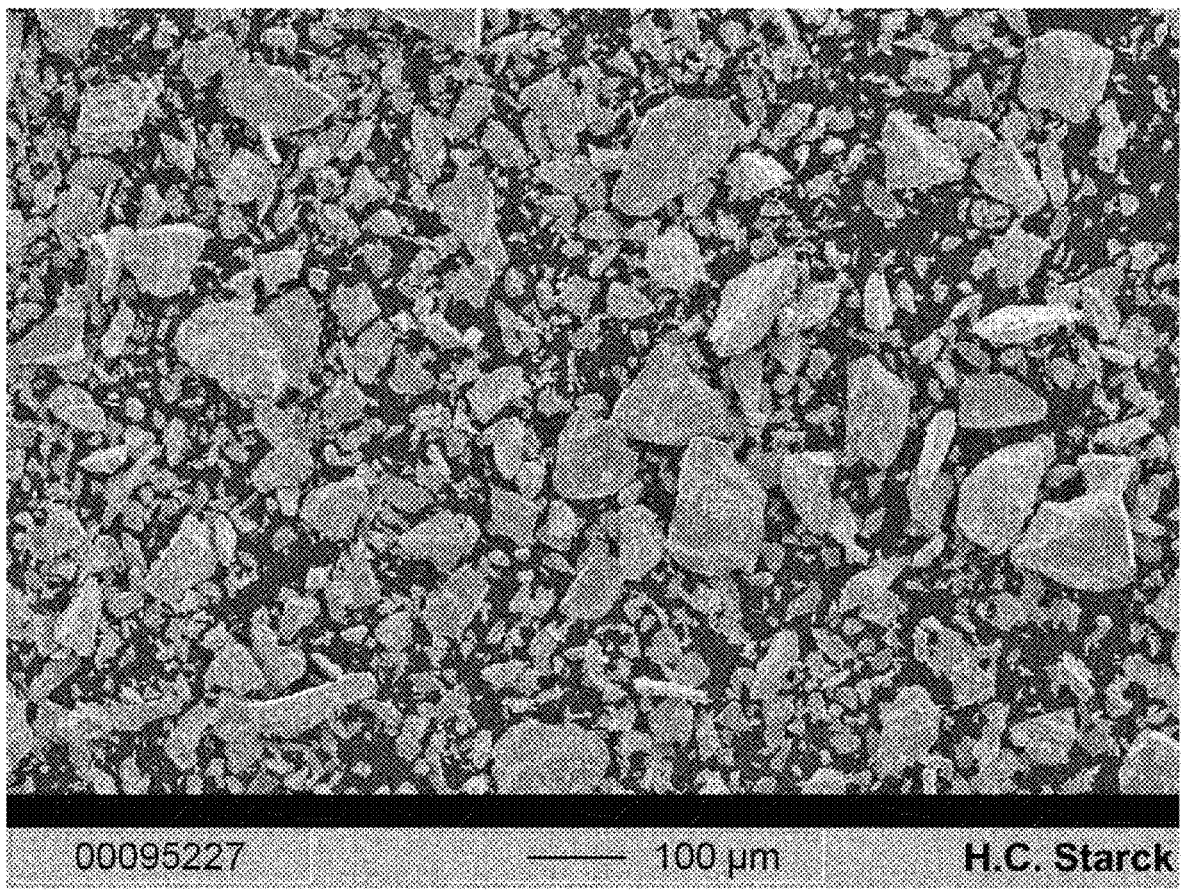
FIG. 8 shows a scanning electron micrograph of the niobium metal powder used for producing Comparative Examples 1 and 2.

FIG. 8 shows a scanning electron micrograph of the niobium metal powder used for producing Comparative Examples 1 and 2.

The present invention is not limited to embodiments described herein: reference should be had to the appended claims.

TABLE 1

| Example | Production | X-ray Diffraction | Phase Composition from Rietveld Analysis | Pore Size [μm] | Primary Particle Size [μm] | Particle Size D50 [μm] | Particle Size D90 [μm] | Particle Size D99 [μm] | BET Surface rea [m²/g] | O content [% by weight] |
|---|---|---|---|---|---|---|---|---|---|---|
| Comparative Example 1 | Nb + 2 Sn 790° C./2 h | Nb, $NbSn_2$, $Nb_3Sn$, NbO | Nb: 51% $NbSn_2$: 24% $Nb_3Sn$: 19% NbO: 6% | — | — | 26 | 77 | 98 | 0.3 | 1.29 |
| Comparative Example 2 | 3 Nb + Sn 1050° C./6 h | $Nb_3Sn$, NbO, Nb, $NbSn_2$ | $Nb_3Sn$: 92% NbO: 3% Nb: 4% $NbSn_2$: 1% | — | — | 39 | 65 | 85 | 0.25 | 1.42 |
| Comparative Example 3 | Nb + 2 Sn 790° C./2 h | $NbSn_2$, Nb, $Nb_3Sn$, | $NbSn_2$: 69% Nb: 10% | — | — | 19 | 34 | 49 | 0.29 | 2.9 |

TABLE 1-continued

| Example | Production | X-ray Diffraction | Phase Composition from Rietveld Analysis | Pore Size [μm] | Primary Particle Size [μm] | Particle Size D50 [μm] | Particle Size D90 [μm] | Particle Size D99 [μm] | BET Surface area [m²/g] | O content [% by weight] |
|---|---|---|---|---|---|---|---|---|---|---|
| | | NbO | $Nb_3Sn$: 15% NbO: 6% | | | | | | | |
| Comparative Example 4 | 3 Nb + Sn 1050° C./6 h | $Nb_3Sn$, NbO, Nb | $Nb_3Sn$: 90% NbO: 8% Nb: 2% | — | — | 28 | 39 | 69 | 0.21 | 3.2 |
| Example 1 | Nb + 2 Sn 790° C./2 h | $NbSn_2$, NbO | $NbSn_2$: 97% NbO: 3% | 3 | <5 | 150 | 277 | 344 | 1.7 | 1.2 |
| Example 2 | 3 Nb + Sn 1050° C./6 h | $Nb_3Sn$, NbO | $Nb_3Sn$: 96% NbO: 4% | 3 | <8 | 156 | 267 | 360 | 1.4 | 1.3 |
| Example 3 | 3 $NbO_2$ + 6$Mg_{(g)}$ + Sn 1050° C./6 h | $Nb_3Sn$, $NbSn_2$ NbO | $Nb_3Sn$: 93% $NbSn_2$: 3% NbO: 4% | 1.5 | <2 | 122 | 234 | 299 | 4.2 | 1.59 |

What is claimed is:

1. A powder for the production of a superconducting component, the powder comprising:
a proportion of $Nb_3Sn$ of >90% based on all crystallographic phases detected as determined via a Rietveld analysis of an X-ray powder diffraction pattern of the powder, or
a proportion of $Nb_6Sn_5$ of >90% based on all crystallographic phases detected as determined via a Rietveld analysis of an X-ray powder diffraction pattern of the powder, or
a proportion of $NbSn_2$ of >90% based on all crystallographic phases detected as determined via a Rietveld analysis of an X-ray powder diffraction pattern of the powder; and
three-dimensional agglomerates having a particle size D90 of less than 400 μm, as determined via a laser light scattering, the three-dimensional agglomerates comprising,
primary particles having an average particle diameter of less than 15 μm, as determined via a scanning electron microscopy, and
pores of which at least 90% have a diameter of from 0.1 to 20 μm, as determined via a mercury porosimetry.

2. The powder as recited in claim 1, wherein,
the proportion of $Nb_3Sn$ is ≥93% based on all crystallographic phases detected as determined via the Rietveld analysis of the X-ray powder diffraction pattern of the powder, or
the proportion of $Nb_6Sn_5$ is ≥94% based on all crystallographic phases detected as determined via the Rietveld analysis of the X-ray powder diffraction pattern of the powder, or
the proportion of $NbSn_2$ is ≥94% based on all crystallographic phases detected as determined via a Rietveld analysis of an X-ray powder diffraction pattern of the powder.

3. The powder as recited in claim 1, wherein the powder further comprises a specific surface area of from 0.5 to 5 m²/g as determined by a BET method.

4. The powder as recited in claim 1, wherein the powder further comprises:
an oxygen content of less than 1.8 wt. % based on a total weight of the powder.

5. The powder as recited in claim 1, wherein,
the three-dimensional agglomerates of the powder are subjected to a milling step in an oxygen-free environment so as to provide milled three-dimensional agglomerates, and
after the milling step, the milled three-dimensional agglomerates have a particle size D99 of less than 15 μm as determined via a laser light scattering.

6. The powder as recited in claim 1, wherein the powder further comprises:
a proportion of metallic tin of less than 3%, based on all crystallographic phases detected as determined via a Rietveld analysis of an X-ray diffraction pattern of the powder.

7. The powder as recited in claim 1, wherein,
the powder is subjected to an atomization step after which the powder further comprises powder particles, and
95% of all of the powder particles have a Feret diameter of from 0.7 to 1, the Feret diameter being a smallest diameter of a particle of the powder particles divided by a greatest diameter of the particle of the powder particles as determined via an evaluation of SEM images.

8. A process for producing the powder as recited in claim 1, the process comprising:
obtaining a niobium metal powder via a reduction of niobium oxide using a gaseous reducing agent; and
reacting the niobium metal powder with a tin metal powder.

9. The process as recited in claim 8, wherein the obtaining of the niobium metal powder via the reduction of niobium oxide using the gaseous reducing agent and the reacting of the niobium metal powder with the tin metal powder is performed in a combined process step.

10. The process as recited in claim 8, wherein the niobium metal powder comprises pores having a size of from 0.1 to 20 μm, as determined via a mercury porosimetry.

11. The process as recited in claim 8, wherein the niobium metal powder comprises three-dimensional agglomerates having a size with a D90 of less than 400 μm, as determined via a laser light scattering, and the three-dimensional agglomerates comprise primary particles having an average particle diameter of less than 10 μm, as determined via a scanning electron microscopy.

12. The process as recited in claim 8, wherein the niobium metal powder has a bimodal distribution of a pore size.

13. The process as recited in claim 8, wherein the niobium oxide is a compound selected from the group consisting of $Nb_2O_5$, $NbO_2$, NbO, and mixtures thereof.

14. The process as recited in claim 8, wherein the gaseous reducing agent is magnesium vapor.

15. The process as recited in claim 8, wherein the niobium metal powder further comprises at least one dopant.

16. A method of using the powder as recited in claim 1 for producing a superconducting component, the method comprising:
   providing the powder as recited in claim 1; and
   producing at least one of a superconducting wire and a superconducting coil as the superconducting component using the powder.

17. The method of using as recited in claim 16, wherein the superconducting component is produced via a powder-metallurgical process.

18. The method of using as recited in claim 17, wherein the powder-metallurgical process is a PIT process or an additive manufacturing process.

19. A method of using the powder as recited in claim 1 in an additive manufacturing process, the method comprising:
   providing the powder as recited in claim 1; and
   using the powder in the additive manufacturing process, wherein,
   the additive manufacturing process is a laser beam melting, an electron beam melting, or a laser cladding.

20. A method of using the powder as recited in claim 1 in a powder-metallurgical process, the method comprising:
   providing the powder as recited in claim 1; and
   using the powder in the powder-metallurgical process.

* * * * *